(12) United States Patent
Van Workum et al.

(10) Patent No.: US 7,983,474 B2
(45) Date of Patent: Jul. 19, 2011

(54) GEOSPATIAL MODELING SYSTEM AND RELATED METHOD USING MULTIPLE SOURCES OF GEOGRAPHIC INFORMATION

(75) Inventors: John A. Van Workum, Melbourne, FL (US); David M. Bell, Palm Bay, FL (US); Eric Spellman, Rockledge, FL (US); Adrian Peter, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 944 days.

(21) Appl. No.: 11/873,765

(22) Filed: Oct. 17, 2007

(65) Prior Publication Data

US 2009/0105954 A1   Apr. 23, 2009

(51) Int. Cl.
*G06K 9/00* (2006.01)
*G06K 9/46* (2006.01)
*G06T 17/00* (2006.01)

(52) U.S. Cl. .................. 382/154; 382/204; 345/420

(58) Field of Classification Search .............. 382/154, 382/190, 204; 345/419, 420
See application file for complete search history.

(56) References Cited

U.S. PATENT DOCUMENTS

| | | | |
|---|---|---|---|
| 5,220,441 A | 6/1993 | Gerstenberger | |
| 5,550,937 A | 8/1996 | Bell et al. | 382/293 |
| 5,606,627 A | 2/1997 | Kuo | |
| 5,608,405 A | 3/1997 | Pritt | |
| 5,835,055 A | 11/1998 | Van der Kooij | |
| 6,011,625 A | 1/2000 | Glass | |
| 6,104,408 A | 8/2000 | Taupin et al. | |
| 6,229,546 B1 | 5/2001 | Lancaster et al. | |
| 6,583,751 B1 | 6/2003 | Ferretti et al. | |
| 6,654,690 B2 | 11/2003 | Rahmes et al. | 702/5 |
| 6,748,121 B2 | 6/2004 | Kim et al. | |
| 6,910,892 B2 | 6/2005 | Lechner | |
| 6,915,310 B2 | 7/2005 | Gutierrez et al. | |
| 7,142,984 B2 * | 11/2006 | Rahmes et al. | 702/5 |
| 7,773,799 B2 * | 8/2010 | Oldroyd | 382/154 |

OTHER PUBLICATIONS

Mikhail Mozerov Ed—Katrin Franke et al: "An Effective Stereo Matching Algorithm with Optimal Path Cost Aggregation" Jan. 1, 2006, Pattern Recognition Lecture Notes in Computer Science;;LNCS, Springer, Berlin, DE, pp. 617-626, XP019043102 ISBN: 978-3-540-44412-1 abstract p. 617, paragraph 1—p. 623, paragraph 3.

Roy S et al: "A maximum-flow formulation of the N-camera stereo correspondence problem" 6th International Conference on Computer Vision. ICCV '98. Bombay, Jan. 4-7, 1998; [IEEE International Conference on Computer Vision], New York, NY : IEEE, US, Jan. 4, 1998, pp. 492-499, XP002346132 ISBN: 978-0-7803-5098-4.

Tang L et al: "Image dense matching based on region growth with adaptive window" Pattern Recognition Letters, Elsevier, Amsterdam, NL, vol. 23, No. 10, Aug. 1, 2002, pp. 1169-1178, XP004349764 ISSN: 0167-8655.

(Continued)

*Primary Examiner* — Daniel G Mariam (74) *Attorney, Agent, or Firm* — Allen, Dyer, Doppelt, Milbrath & Gilchrist, P.A.

(57) ABSTRACT

A geospatial modeling system may include at least one geospatial information database to store stereo-geographic image data and geographic feature data. A processor may cooperate with the geospatial information database for generating cost coefficients defining a three-dimensional (3D) cost cube using image matching operators based upon the stereo-geographic image data, adjusting the cost coefficients of the 3D cost cube based upon the geographic feature data to generate an adjusted 3D cost cube, and generating a geospatial model based upon solving the adjusted 3D cost cube, e.g. for a best cost surface. The system and method provide an integrated approach to creating a geospatial model using available data from multiple sources.

21 Claims, 6 Drawing Sheets

OTHER PUBLICATIONS

Chehata et al., Internet article on "A Region-Based Matching Approach for 3D-Roof Reconstruction from HR Satellite Stereo Pairs", Proc. VIIth Digital Image Computing, dated Dec. 10-12, 2003, Sydney, pp. 889-897.

Rauschert, "Window-based Stereo-Correlation in a Teleoperation Task", Thesis of Ingmar Rauschert submitted in Jun. 2001 to the Institute for Real-Time Computer Systems Technical University of Munich, Germany.

Hutton et al., "Automated Registration of 3D Faces Using Dense Surface Models", Biomedical Informatics Unit, University College London, U.K., British Machine Vision.

Sheng et al., Internet article on "Model-Based Conifer-crown Surface Reconstruction from High-resolution Aerial Images", Geographic Information Sciences, 2001, vol. 67; Part 8, pp. 957-966.

* cited by examiner

GEOSPATIAL MODELING SYSTEM AND RELATED METHOD USING MULTIPLE SOURCES OF GEOGRAPHIC INFORMATION

FIELD OF THE INVENTION

The present invention relates to the field of topographical modeling, and, more particularly, to geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be helpful in applications such as cellular antenna placement, urban planning, disaster preparedness and analysis, and mapping, for example.

Various types of topographical models are presently being used. One common topographical model is the digital elevation model (DEM) or digital surface model (DSM). A DEM is a sampled matrix representation of a geographical area which may be generated in an automated fashion by a computer. In a DEM, coordinate points are made to correspond with a height or elevation value. A tiled triangulated irregular network (T-TIN) is another type of geospatial model. As would be appreciated by the skilled artisan, a triangulated irregular network may include a surface representation derived from irregularly spaced sample points and break line features. The T-TIN data set includes topological relationships between points and their neighboring triangles. Each sample point has an x, y coordinate and a surface, or z-value. These points are connected by edges to form a set of non-overlapping triangles used to represent the surface. Tins are also called irregular triangular mesh or irregular triangular surface models.

Conventional DEMs are typically used for modeling terrain where the transitions between different elevations (e.g., valleys, mountains, etc.) are generally smooth from one to a next. That is, DEMs typically model terrain at spacings of 0-30 meters presently and as a plurality of curved surfaces and any discontinuities there between are thus "smoothed" over. Thus, in a typical DEM distinct objects may not be present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and Light Detection and Ranging (LIDAR), for example.

Another advantageous approach for generating 3D site models is set forth in U.S. Pat. No. 6,654,690 to Rahmes et al., which is also assigned to the present Assignee and is hereby incorporated herein in its entirety by reference. This patent discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

One potentially challenging aspect of generating geospatial models such as DEMS is that high resolutions (i.e., data point or post spacing of $\leq 1$ m) are becoming the norm for terrain representation and an important part of the process to create 3D city models (e.g. Virtual Earth), emergency planning efforts (e.g. flood plane studies), battle damage assessment and/or city planning efforts (e.g. skyline prediction), for example. As the density of data points in high resolution DEMS (HRDEMs) increases, so too does the volume of data generated for such models. The size of these models can be extremely burdensome to even the most powerful geospatial data processing computers in some applications.

An integrated approach may be helpful to create DEMs or DSMs using available data, e.g. from multiple sources. For example, the approach should be capable of using multiple overlapping and non-overlapping stereo image pairs, including edge data from the images and/or area correlation data, as well as known ground truth information regarding roads and/or water boundaries, for example, and image segmentation data. The approach should preferably be capable of using relatively small correlation patches, e.g. 3×3 patches.

Figure 1:
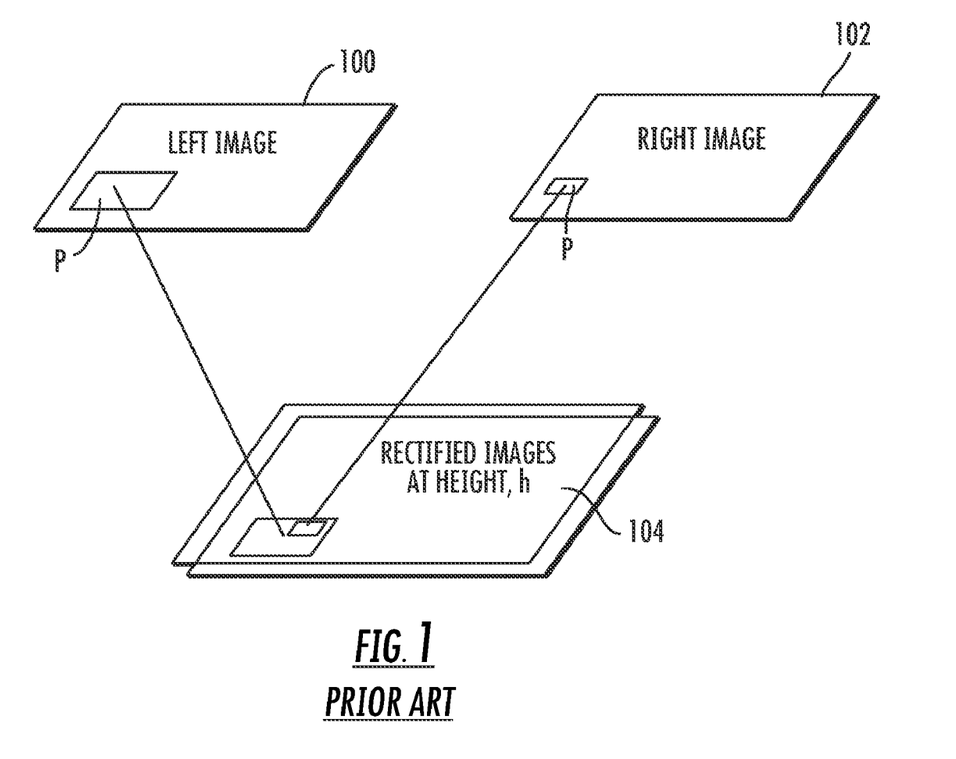
FIG. 1 is a schematic diagram illustrating a conventional approach for generating a digital elevation model (DEM) in accordance with the prior art.

Referring to the schematic diagram of FIG. 1, current approaches may include the extraction of patches P from left and right images 100, 102, correlation of patches to form a correlation surface 104 and finding the peak thereof. The peak location is analyzed to compute the height and location of the elevation post, and the process may be repeated for multiple points on an initial post grid. The DEM is generated and then corrected with ad-hoc techniques to incorporate additional data. However, each post height is computed from local data only, the approach is only typically applicable to a single stereo pair of images, and the combining of DEMs (composite DEMs) and additional truth data (e.g. roads, lakes, etc.) using ad-hoc techniques may lead to complex and error-prone results. Moreover, the larger correlation patches (e.g. 16×16) may blur details of the DEM and limit resolution, and elevations may not be produced at desired post locations and are typically interpolated to get height at the desired locations.

SUMMARY OF THE INVENTION

In view of the foregoing background, it is therefore an object of the present invention to provide a system and related methods for an integrated approach to creating a geospatial model using available data from multiple sources.

This and other objects, features, and advantages are provided by a geospatial modeling system including at least one geospatial information database to store stereo-geographic image data and geographic feature data. A processor cooperates with the at least one geospatial information database for generating cost coefficients defining a three-dimensional (3D) cost cube based upon image matching operators on stereo-geographic image data, adjusting the cost coefficients of the 3D cost cube based upon the geographic feature data to generate an adjusted 3D cost cube, solving the adjusted cost cube and generating a geospatial model based upon the adjusted 3D cost cube.

The processor may generate the cost coefficients defining the 3D cost cube by, at least, rectifying the stereo-geographic image data, and extracting same size image patches from the rectified stereo-geographic image data. The processor may generate the cost coefficients defining the 3D cost cube by combining the individual cost coefficients for pairs of same size image patches, and repeating the determining of the cost coefficients for a range of x,y,z locations in the cost cube.

The geographic feature data may be associated with at least one known geographic feature having a known geospatial position. The at least one known geographic feature may comprise at least one of a known natural and known man-made feature.

The processor may cooperate with the at least one geospatial information database for finding a desired cost surface, such as a best or lowest cost surface, through the adjusted 3D cost cube. The stereo-geographic image data may comprise high resolution image data and image segmentation data associated therewith. Also, a display may be operatively connected to the processor. The processor may generate the geospatial model as a tiled triangulated irregular network (T-TIN) geospatial model or a raster grid of height values, for example.

A method aspect is directed to a geospatial modeling method including storing stereo-geographic image data and geographic feature data, and processing the stored stereo-geographic image data and geographic feature data to generate cost coefficients defining a three-dimensional (3D) cost cube based upon the stereo-geographic image data, adjust the cost coefficients of the 3D cost cube based upon the geographic feature data to generate an adjusted 3D cost cube, and generate a geospatial model based upon the adjusted 3D cost cube.

Processing the stored stereo-geographic image data and geographic feature data to generate the cost coefficients defining the 3D cost cube may include rectifying the stereo-geographic image data, and extracting same size image patches from the rectified stereo-geographic image data. Also, processing the stored stereo-geographic image data and geographic feature data to generate the cost coefficients defining the 3D cost cube may include performing image matching operators on pairs of same size image patches to compute cost coefficients for pairs of same size image patches, and repeating the determining of the cost coefficients for a range of x,y,z voxel locations in the cost cube.

Storing the geographic feature data may comprise storing geographic feature data associated with at least one known geographic feature, such as a known natural and known man-made feature, having a known geospatial position. Processing the stored stereo-geographic image data and geographic feature data may include finding a desired minimum cost surface through the adjusted 3D cost cube to generate the geospatial model. Also, storing the stereo-geographic image data may comprise storing high resolution image data and image segmentation data associated therewith.

Another aspect of the present invention is directed to a computer readable medium comprising program instructions for: acquiring stereo-geographic image data and geographic feature data; and processing the acquired stereo-geographic image data and geographic feature data to generate cost coefficients defining a three-dimensional (3D) cost cube based upon the stereo-geographic image data, to adjust the cost coefficients of the 3D cost cube based upon the geographic feature data to generate an adjusted 3D cost cube, and to generate a geospatial model based upon the adjusted 3D cost cube.

The approach of the present invention may use multiple overlapping and non-overlapping stereo image pairs, including edge data from the images and/or area correlation data, as well as known ground truth information regarding roads and/or water boundaries, for example, and image segmentation data. The approach may also use relatively small correlation patches, e.g. 3×3 patches. Resolution of the geospatial model, e.g. DEM, may be improved via the ability to use smaller correlation patches, and potentially higher accuracy may be achieved through use of multiple stereo pairs at each post.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 2:
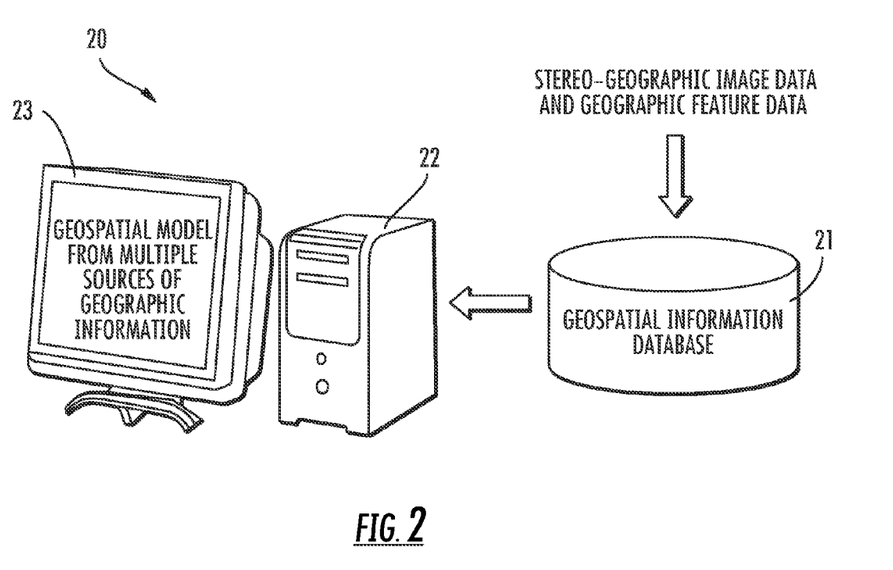
FIG. 2 is a schematic diagram illustrating a geospatial modeling system using geographic data from multiple sources in accordance with the present invention.
Figure 3:
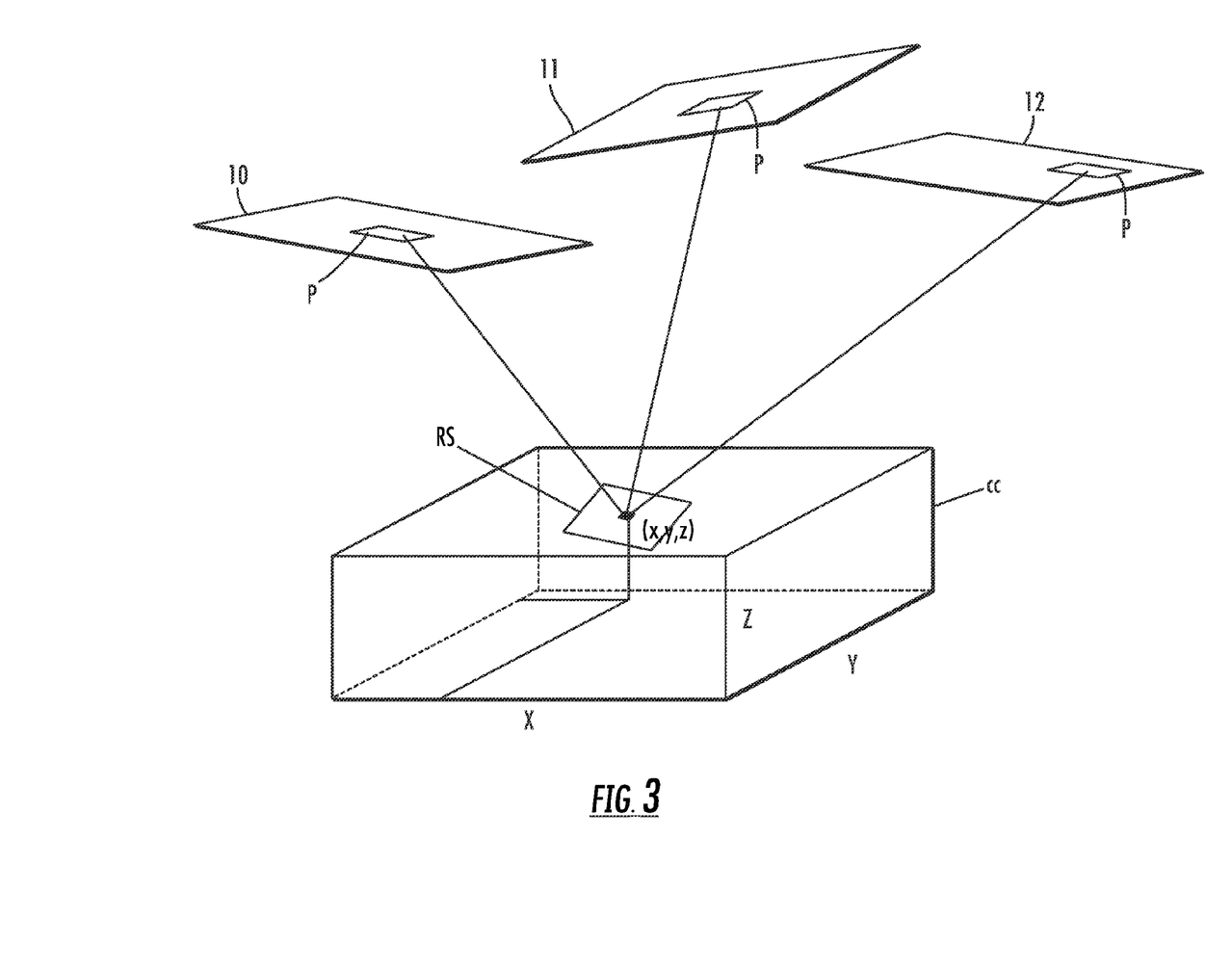
FIG. 3 is a schematic diagram illustrating an approach for generating a geospatial model in accordance with the present invention.

Referring initially to FIGS. 2 and 3, a geospatial modeling system 20 will be described. The geospatial modeling system may include at least one geospatial information database 21 to store stereo-geographic image data and geographic feature data. As would be appreciated by those skilled in the art, the geospatial information, i.e. the stereo-geographic image data and geographic feature data, may also be stored in multiple databases. The stereo-geographic image data is preferably two or more images 10, 11, 12 of the same location (e.g. as illustrated in FIG. 3). By way of example, the stereo-geographic image data may be captured using various techniques, such as stereo optical imagery, Light Detecting And Ranging (LIDAR), Interferometric Synthetic Aperture Radar (IFSAR), etc., as will be appreciated by those skilled in the art.

The geographic feature data may be associated with at least one known geographic feature having a known geospatial position, for example, a water body boundary. The at least one known geographic feature may comprise at least one of a known natural (e.g. a lake) and known man-made (e.g. a road) feature.

Figure 6:
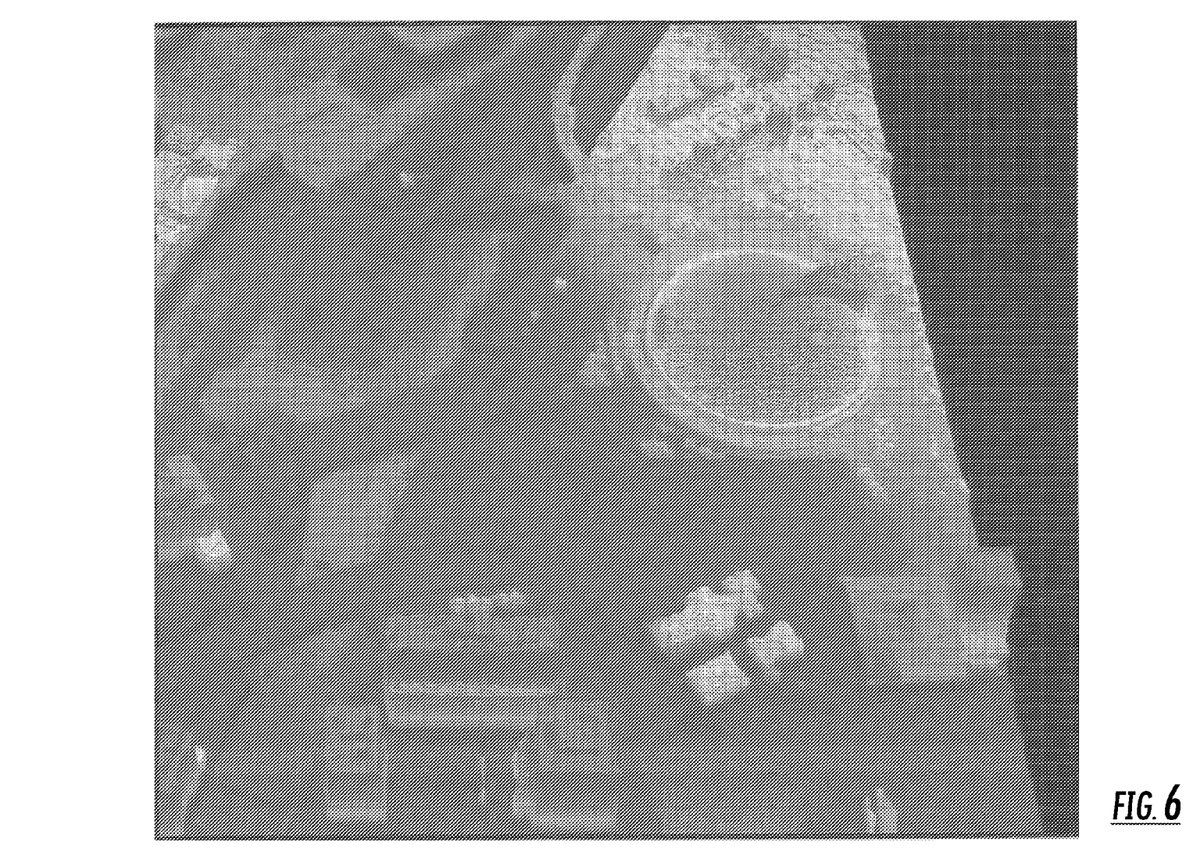
FIG. 6 is a display image of a geospatial model generated in accordance with the approach of the present invention.

A processor 22 cooperates with the at least one geospatial information database 21 for generating cost coefficients defining a three-dimensional (3D) cost cube based upon the stereo-geographic image data. The 3D cost cube is a volume of elements, e.g. voxels, with a cost coefficient at each voxel. The processor 22 may adjust the cost coefficients of the 3D correlation cube based upon the geographic feature data to generate an adjusted 3D cost cube. The processor 22 generates a geospatial model (e.g. a DEM as shown in FIG. 6) based upon the adjusted 3D cost cube.

By way of example, the processor 22 may be a central processing unit (CPU) of a PC, Mac, or other computing workstation, for example. A display 23 is also operatively coupled to the processor 22 in the illustrated embodiment for displaying geospatial modeling data, as will be discussed further below.

The processor 22, may generate the cost cube CC as schematically illustrated in FIG. 3, by rectifying the stereo-geographic image data on a rectification surface, RS, located at a point (x,y,z) in the cost cube, CC. The rectification surface, RS, may have any orientation necessary to optimize the cost computation, Same size image patches, P, are extracted from the rectified stereo-geographic image data at x,y,z. An image matching operation is applied on all pairs of same size patches to obtain cost coefficients and the coefficients from all pairs are combined into a single value that is assigned to the cost cube voxel located at x,y,z. The process is repeated for all voxels within the cost cube. The cost cube x, y and z dimensions may be scaled geographic coordinates of latitude, longitude and height or UTM coordinates of northing, easting and height or any other representation of physical ground coordinates.

The processor 22 may cooperate with the geospatial information database 21 for finding a desired cost surface, such as a best or lowest cost surface, through the adjusted 3D cost cube. The desired cost surface may be expressed as a cost function applied at each voxel and neighbors, e.g. strong correlations=low cost and weak correlations=high cost.

The stereo-geographic image data may comprise high resolution image data and image segmentation data associated therewith. The processor 22 may generate the geospatial model as a tiled triangulated irregular network (T-TIN) geospatial model As would be appreciated by the skilled artisan, a triangulated irregular network may include a surface representation derived from irregularly spaced sample points and break line features. The T-TIN data set includes topological relationships between points and their neighboring triangles. Each sample point has an x, y coordinate and a surface, or z-value. These points are connected by edges to form a set of non-overlapping triangles used to represent the surface. Tins are also called irregular triangular mesh or irregular triangular surface models.

The processor 22 may also generate the geospatial model or DEM as regularly spaced grid points with a height value at each point. For example, a typical grid may be between 50 and 500 meters.

Accordingly, the system 20 may use multiple overlapping and non-overlapping stereo image pairs, including edge data from the images and/or area correlation data, as well as known ground truth information regarding roads and/or water boundaries, for example, and image segmentation data to generate the cost cube. The approach may also use relatively small image patches for correlation, e.g. 3×3 patches.

Figure 4:
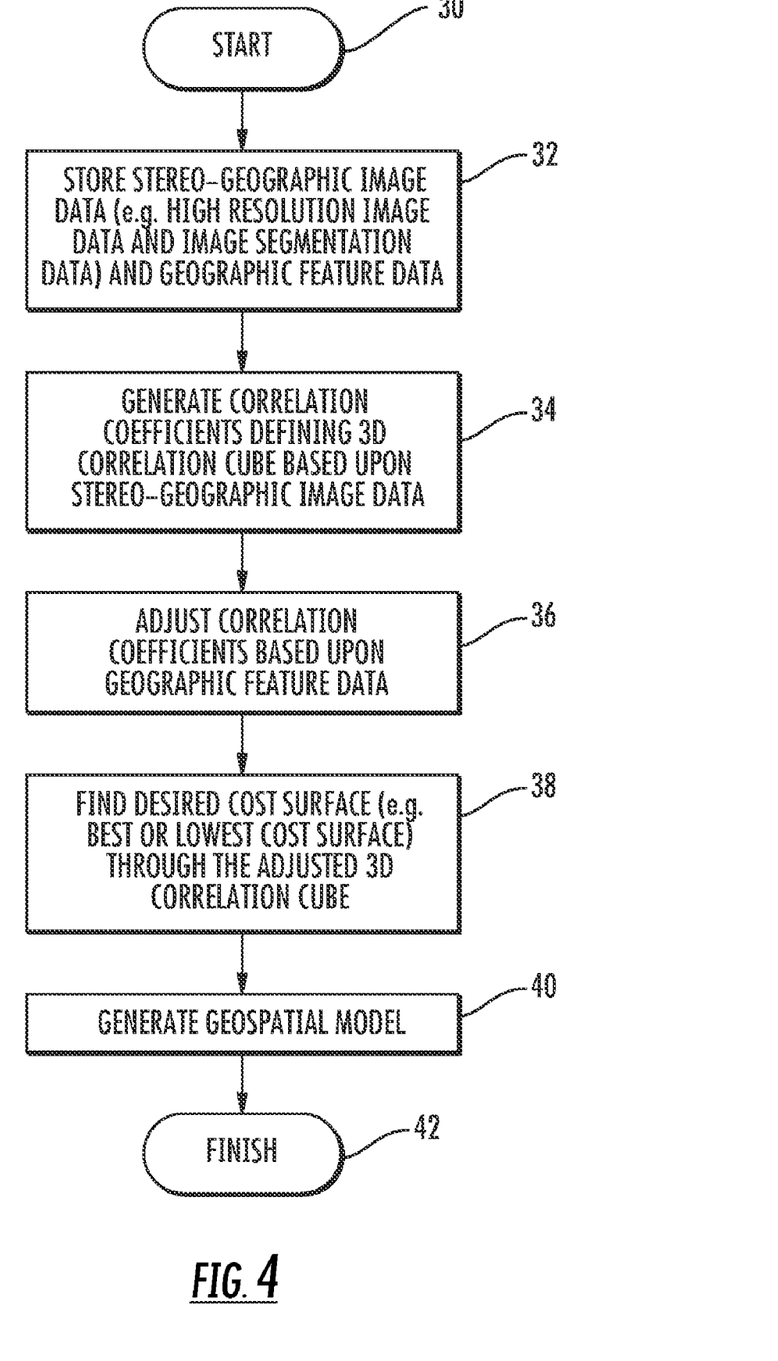
FIG. 4 is a flowchart illustrating various steps of a method for generating a geospatial model in accordance with the present invention.

A method aspect will be discussed with reference to FIGS. 4 and 5 and is directed to a geospatial modeling method. The method begins (block 30) and includes storing stereo-geographic image data and geographic feature data, at block 32. Processing the stored stereo-geographic image data and geographic feature data includes generating cost coefficients defining a three-dimensional (3D) cost cube based upon the stereo-geographic image data (block 34), adjusting the cost coefficients of the 3D correlation cube based upon the geographic feature data to generate an adjusted 3D cost cube (block 36), and generating a geospatial model (e.g. as shown in FIG. 6) based upon the adjusted 3D correlation cube (block 40) before ending at block 42. Processing the stored stereo-geographic image data and geographic feature data may also include, at block 38, finding a desired cost surface through the adjusted 3D cost cube to generate the geospatial model, as discussed above.

Figure 5:
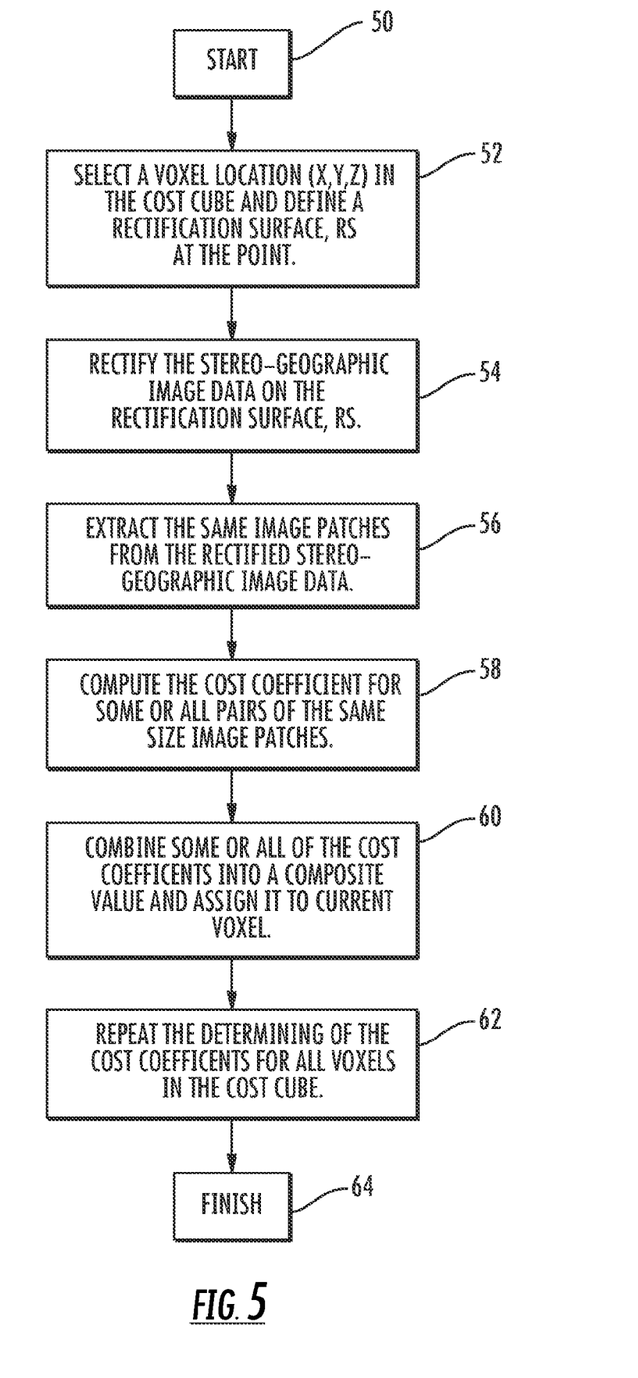
FIG. 5 is a flowchart illustrating further steps of generating a 3D cost cube in the method of FIG. 4.

Referring more specifically to the flowchart of FIG. 5, processing the stored stereo-geographic image data and geographic feature data to generate the cost coefficients defining the 3D cost cube may begin at block 50. The process may include selecting a voxel location (x,y,z) in the Cost Cube and defining a rectification surface at that point, 52, and rectifying the stereo-geographic image data on the rectification surface, RS, 54. Additionally, it may include extracting same size image patches from the rectified stereo-geographic image data, 56, and computing a cost coefficient for some or all pairs of the same size image patches, 58. The cost coefficients may be based on any image matching operator such as correlation, image gradients, maximum entropy, pixel differences, etc., or any combination of such operators. The cost coefficients for all pairs of same size image patches may be combined into a single value that may be assigned to the voxel location, 60. The process may be repeated for each voxel in the cost cube, 62. Such process ends at block 64.

A computer readable medium may include program instructions for implementing the method described above. For example, the program instructions may control a processor 22 or computer to acquire and/or store stereo-geographic image data and geographic feature data, and process the acquired stereo-geographic image data and geographic feature data to generate cost coefficients defining a three-dimensional (3D) cost cube based upon the stereo-geographic image data, to adjust the cost coefficients of the 3D cost cube based upon the geographic feature data to generate an adjusted 3D cost cube, and to generate a geospatial model based upon the adjusted 3D cost cube. Again, the geospatial model may be displayed on the a display, e.g. display 23

The system and associated methods described herein may incorporate all available data into one natural problem space (i.e. the cost cube). The desired or final surface represents a global approach to solving the cost cube for a lowest cost surface. Resolution of the geospatial model, e.g. DEM, may be improved via the ability to use smaller correlation patches, and potentially higher accuracy may be achieved through use of multiple stereo pairs at each post. Ad-hoc approaches to combining multiple data sources are avoided. Moreover, the approach includes the capability to use additional sources of information such as water body boundaries, image segmentation data, and locations of edges in images.

The approach may offer faster DEM generation, and higher resolution DEMs for existing image sources, such as post spacing from 3 m to 0.1 m, and/or the potential of computing one post per image pixel. More accurate DEMs may be generated for urban areas as the use of multiple stereo image pairs at a single post provides elevation data to be obtained in areas that are obscured in one or more of the stereo pairs.

Many modifications and other embodiments of the invention will come to the mind of one skilled in the art having the benefit of the teachings presented in the foregoing descriptions and the associated drawings. For example, methods to make the computation of the cost coefficients more efficient without computing a rectification surface at each voxel may be included. There may be numerous techniques for solving the cost cube including, simulated annealing, dynamic programming, conjugate gradient, etc. as well as combinations of the techniques. Multi-pass techniques include an initial solution being formed and analyzed to identify/modify areas of the cost cube which is then resolved. The approach described here is not limited to overhead stereo-geographic imagery. It may by applied to oblique images of ground scenes, images of general objects taken from ground level, medical images, etc. Therefore, it is understood that the invention is not to be limited to the specific embodiments disclosed, and that modifications and embodiments are intended to be included within the scope of the appended claims.

The invention claimed is:

1. A geospatial modeling system comprising:
   at least one geospatial information database to store stereo-geographic image data and geographic feature data; and
   a processor cooperating with said at least one geospatial information database for
      generating cost coefficients defining a three-dimensional (3D) cost cube based upon the stereo-geographic image data,
      adjusting the cost coefficients of the 3D cost cube based upon the geographic feature data to generate an adjusted 3D cost cube, and
      generating a geospatial model based upon the adjusted 3D cost cube.

2. The geospatial modeling system of claim 1 wherein said processor generates the cost coefficients defining the 3D cost cube by performing at least:
   rectifying the stereo-geographic image data; and
   extracting same size image patches from the rectified stereo-geographic image data.

3. The geospatial modeling system of claim 1 wherein said processor generates the cost coefficients defining the 3D cost cube by further performing at least:
   combining cost coefficients for pairs of same size image patches; and
   repeating the determining of the cost coefficients for a range of x,y,z voxel locations in the cost cube.

4. The geospatial modeling system of claim 1 wherein the geographic feature data is associated with at least one known geographic feature having a known geospatial position.

5. The geospatial modeling system of claim 1 wherein said processor cooperates with said at least one geospatial information database for finding a desired cost surface through the adjusted 3D cost cube.

6. The geospatial modeling system of claim 1 wherein the stereo-geographic image data comprises high resolution image data and image segmentation data associated therewith.

7. The geospatial modeling system of claim 1 further comprising a display operatively connected to said processor.

8. The geospatial modeling system of claim 1 wherein said processor generates the geospatial model as a tiled triangulated irregular network (T-TIN) geospatial model.

9. A geospatial modeling system comprising:
   at least one geospatial information database to store stereo-geographic image data and geographic feature data, the geographic feature data being associated with at least one known geographic feature having a known geospatial position; and
   a processor cooperating with said at least one geospatial information database for
      generating cost coefficients defining a three-dimensional (3D) cost cube based upon the stereo-geographic image data,
      adjusting the cost coefficients of the 3D cost cube based upon the geographic feature data to generate an adjusted 3D cost cube, and
      finding a desired cost surface through the adjusted 3D cost cube and generating a geospatial model based thereon.

10. The geospatial modeling system of claim 9 wherein said processor generates the cost coefficients defining the 3D cost cube by performing at least:
    rectifying the stereo-geographic image data; and
    extracting same size image patches from the rectified stereo-geographic image data.

11. The geospatial modeling system of claim 9 wherein said processor generates the cost coefficients defining the 3D cost cube by further performing at least:
    determining combined cost coefficients for pairs of same size image patches; and
    repeating the determining of the cost coefficients for a range of x,y,z voxel locations in the cost cube.

12. The geospatial modeling system of claim 9 wherein the stereo-geographic image data comprises high resolution image data and image segmentation data associated therewith.

13. A geospatial modeling method comprising:
    storing stereo-geographic image data and geographic feature data;
    processing the stored stereo-geographic image data and geographic feature data to
       generate cost coefficients defining a three-dimensional (3D) cost cube based upon the stereo-geographic image data,
       adjust the cost coefficients of the 3D cost cube based upon the geographic feature data to generate an adjusted 3D cost cube, and
       generate a geospatial model based upon the adjusted 3D cost cube; and
    displaying the geospatial model on a display.

14. The geospatial modeling method of claim 13 wherein processing the stored stereo-geographic image data and geographic feature data to generate the cost coefficients defining the 3D cost cube includes at least:
    rectifying the stereo-geographic image data; and
    extracting same size image patches from the rectified stereo-geographic image data.

15. The geospatial modeling method of claim 13 wherein processing the stored stereo-geographic image data and geographic feature data to generate the cost coefficients defining the 3D cost cube includes at least:
    determining combined cost coefficients for pairs of same size image patches; and
    repeating the determining of the cost coefficients for a range of x,y,z voxel locations in the cost cube.

16. The geospatial modeling method of claim 13 wherein storing the geographic feature data comprises storing geographic feature data associated with at least one known geographic feature having a known geospatial position.

17. The geospatial modeling method of claim 13 wherein processing the stored stereo-geographic image data and geographic feature data includes finding a desired cost surface through the adjusted 3D cost cube to generate the geospatial model.

18. The geospatial modeling method of claim 13 wherein storing the stereo-geographic image data comprises storing high resolution image data and image segmentation data associated therewith.

19. A non-transitory computer readable medium comprising program instructions for:
  acquiring stereo-geographic image data and geographic feature data; and
  processing the acquired stereo-geographic image data and geographic feature data to
    generate cost coefficients defining a three-dimensional (3D) cost cube based upon the stereo-geographic image data,
    adjust the cost coefficients of the 3D cost cube based upon the geographic feature data to generate an adjusted 3D cost cube, and
    generate a geospatial model based upon the adjusted 3D cost cube.

20. The computer readable medium of claim 19 wherein processing the acquired stereo-geographic image data and geographic feature data to generate the cost coefficients defining the 3D cost cube includes at least:
  rectifying the stereo-geographic image data; and
  extracting same size image patches from the rectified stereo-geographic image data.

21. The computer readable medium of claim 19 wherein processing the stored stereo-geographic image data and geographic feature data to generate the cost coefficients defining the 3D cost cube includes at least:
  determining combined cost coefficients for pairs of same size image patches; and
  repeating the determining of the cost coefficients for a range of x,y,z voxel locations in the cost cube.

* * * * *